United States Patent [19]

Brown et al.

[11] 4,131,641

[45] Dec. 26, 1978

[54] NICKEL RECOVERY PROCESS

[75] Inventors: Milton S. Brown, Deer Park, Tex.; Richard M. Burch, Kenner, La.; Guy M. Warth, Houston, Tex.

[73] Assignee: Rohm and Haas Company, Philadelphia, Pa.

[21] Appl. No.: 851,087

[22] Filed: Nov. 14, 1977

[51] Int. Cl.² .............................................. C01G 53/08
[52] U.S. Cl. ........................................ 423/34; 423/38; 423/150
[58] Field of Search .................. 260/526 N, 533 A; 423/150, 493, 34, 38, 42

[56] References Cited

U.S. PATENT DOCUMENTS

| 2,613,222 | 10/1952 | Specht et al. | 260/533 A |
| 3,896,208 | 7/1975 | Dubeck | 423/150 |
| 3,953,306 | 4/1976 | Lancy | 423/34 |
| 4,070,437 | 1/1978 | Van Ceulen | 423/493 |

Primary Examiner—Brian Hearn
Attorney, Agent, or Firm—Jordan J. Driks

[57] ABSTRACT

Disclosed is a process for the recovery of nickel from nickel-containing wastes, which comprises the steps of slurrying the waste with a nickel brine solution; reacting the slurry by addition of an oxidizing agent solution, followed by anhydrous hydrogen chloride to obtain a nickel chloride containing reaction mixture; and, filtering the reaction mix to obtain the nickel chloride solution.

7 Claims, 1 Drawing Figure

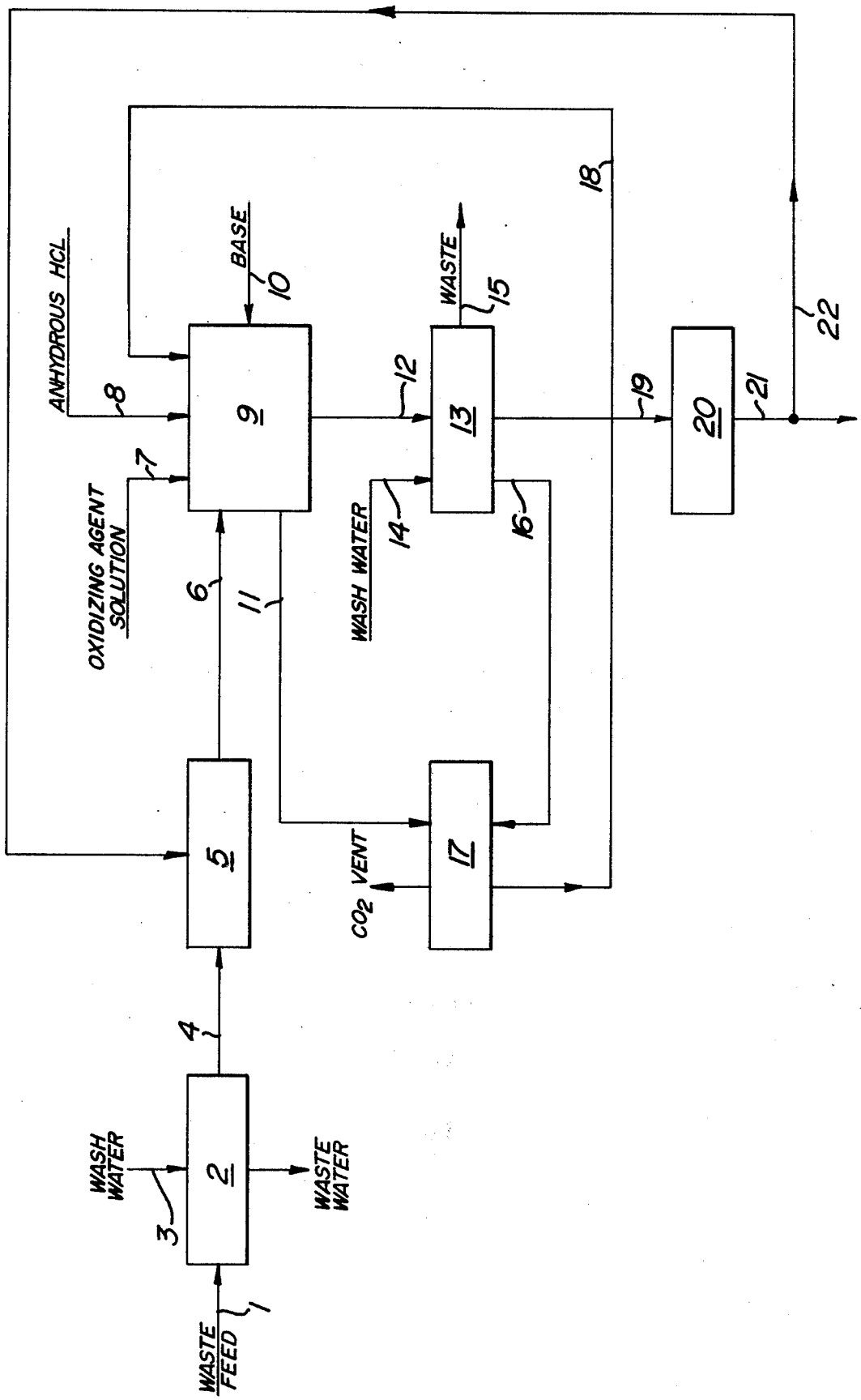

NICKEL RECOVERY PROCESS

THE DISCLOSURE

This invention relates to a process for the recovery of nickel from nickel-containing wastes.

Industrial processes, which use nickel compounds, often generate wastes containing low but recoverable levels of nickel. A typical example is the catalytic process for the manufacture of acrylates using nickel carbonyl. Waste streams from this process contain about 4% of recoverable nickel, which economics no longer allow to be discarded. Similarly, other processes giving rise to nickel-containing wastes can no longer afford to discard them in spite of the low level of nickel contained therein.

The problems associated with recovery of nickel from such industrial wastes require a carefully defined recovery process. First, the amount of nickel present is low. This then requires that recovery be as complete as possible to obtain the maximum benefit from the waste. Second, the nickel waste contains other elements, such as iron, copper and sulfur, along with various organic compounds which must be dealt with so as to permit maximum nickel recovery. Third, the nickel must be recovered in a form which allows it to be used as recovered or at least with a minimum of further processing. Fourth, any components used in the recovery process must themselves be recoverable if not completely used in the recovery. Fifth, the cost of recovery must be at least competitive with the cost of comparable nickel available commercially. Sixth, the recovery of nickel from waste must not itself generate any atmospheric or water polluting waste, and ideally is such that it can be run continuously with component recycle.

All these requirements are now met in the present invention, which is a process for the recovery of nickel from industrial wastes. The process comprises the steps of slurrying the waste with a nickel brine solution; reacting the slurry by addition of an oxidizing agent, followed by anhydrous hydrogen chloride to obtain a nickel chloride containing reaction mix; and, filtering the reaction mix to obtain the nickel chloride solution.

It is necessary to concentrate the waste so as to decrease the amount of water soluble materials and increase the concentration of recoverable nickel. Accordingly, the waste is washed and filtered, the number of washes required being determined by the point at which nickel concentration in the filtrate decreases to a minimum and remains at a constant maximum in the filtered waste and the point at which no further soluble components are detected in the wash and their concentration in the waste reaches a constant level. In the case of acrylate manufacture waste, the thoroughness of the wash is determined by the light color of the filtrate as well as by the point at which the filtrate contains a minimum level of nickel and the washed waste contains a minimum of iron, copper and sodium.

The waste filter cake is then slurried with a nickel brine. The nickel brine is merely a recycle portion of the product nickel chloride solution to be obtained by the recovery process. The brine serves the function of a heat sink to control reaction temperatures. In the acrylate process waste situation, for example, two parts of 8% nickel brine per one part of filter cake are necessary in order to run the subsequent reaction without need for external cooling. The use of a slurry also has the advantage of ease of handling as well as ease of sampling for analysis to determine reaction feed quantities.

The slurry is then fed to a reactor. The reaction requires precise monitoring and reactant addition in order to achieve maximum nickel recovery. The first component to be added is an oxidizing agent solution, with a 45% sodium chlorate solution being most preferred. The oxidant prevents excessive foaming in the reactor and prevents the formation of hydrogen sulfide off-gas. Moreover, since addition of an oxidizing agent to the surface of a foaming acidic reaction slurry can result in a fire, as apparently the organic components present in the foam are being rapidly oxidized, it is preferable to add the oxidizing agent prior to acidification of the slurry.

Suitable oxidizing agents are those inorganic and organic oxidizing agents having the ability to oxidize the metal sulfide present in the slurry. Among the specific materials which may serve as suitable oxidizing agents are hydrogen peroxide, alkali metal peroxides, alkali metal chlorates and perchlorates, potassium permanganate, benzoyl peroxide, alkali metal chromates, and perchromates, and the like. A preferred group oxidizing agents are the alkali metal chlorates.

After addition of oxidizing agent, a nickel wash-absorber solution, which is a solution obtained by water washing the reaction mix filter cake, which also contains hydrogen chloride by virtue of being used as an absorber of excess hydrogen chloride gas, is added to the slurry followed by an anhydrous hydrogen chloride feed which initiates the reaction. The temperature of reaction increases, upon addition of hydrogen chloride. In the acrylate waste situation, the temperature increases to a maximum of 90° C., the nickel brine used to make the slurry acting as a heat sink to keep the maximum temperature in the 80°-90° C. range. The reaction is complete when the reaction slurry color changes to green, a change preceded by an increase in rate of temperature increase. The reactor is vented to an off-gas absorber which scrubs carbon dioxide and excess hydrogen chloride from the reaction, the carbon dioxide being vented to the atmosphere and the hydrogen chloride being absorbed into the absorber water.

The color change to green (the color of nickel and copper chloride solutions) signals the end point of the reaction. Failure to supply enough oxidizing agent will result in low exotherm and no ensuing color change. Thus, oxidizing agent is added incrementally until the exotherm and ensuing color change occur.

This final exotherm, which in the case of acrylate process waste represents the conversion of nickel and copper sulfide to nickel and copper chloride, is accompanied by continued addition of hydrogen chloride, so as to insure complete conversions and high recoveries of nickel. Moreover, the temperature range of the reaction, for maximum nickel recovery and minimum iron recovery in the product solution, should be approximately 30°-90° C.

The aforementioned off-gas absorber is then used as an absorber to scrub excess unreacted hydrogen chloride from the reaction, as well as the carbon dioxide formed during the reaction, the latter being vented to the atmosphere. This hydrogen chloride containing absorber solution is added to the reaction slurry after addition of the oxidizing agent.

Once the reaction is complete and all gases absorbed or vented, a base is added to adjust the pH of the reaction mix to approximately 2.5 so as to precipitate any iron recovered in the process. The base may be an alkali metal or alkaline earth metal hydroxide solution, and a 50% aqueous sodium hydroxide solution is most preferred. At a pH<4.5, however, nickel hydroxide begins to precipitate, and as a result 2.5 is chosen as the final pH of the reaction mix prior to filtration. The addition of base must be accompanied by vigorous stirring to prevent pockets of high pH which cause precipitation of nickel as $Ni(OH)_2$.

The reaction mix, following pH adjustment to precipitate iron, is filtered to obtain a nickel chloride "brine" solution, which in the case of acrylate process waste has about 8% nickel. Any sulfur present is now in the form of colloidal sulfur which passes into the recovered brine, but can be removed by coagulation following a final pH adjustment and filtration of the nikel chloride brine solution. The filtered reaction mix forms a filter cake which is then washed with water. This wash water forms the already mentioned off-gas absorber, while the filter cake, after washing, is discarded.

Copper can be effectively removed from the product nickel brine solution by use of complexing agents. Some complexing agents useful in this regard are sodium oxalate-oxalic acid, sodium oleate-oleic acid, sodium citrate-citric acid, 8-hydroxyquinoline, and so forth. A ratio of 1-3:1 for complexing agent to copper can effectively remove up to 97.5% of the copper present in solution.

BRIEF DESCRIPTION OF DRAWING

The principles of this invention can be more readily understood by the following description which refers to the accompanying flow-sheet schematically representing the steps of the overall process.

A nickel-containing waste stream 1 is fed to filtration apparatus 2 wherein it is filtered and washed with a wash water stream 3. The filter cake is washed until the filter cake contains a constant maximum nickel concentration and the waste water contains a constant minimum concentration of soluble components, such as copper, iron and so forth. The filter cake is then transferred by 4 to slurry tank 5, wherein the filter cake is slurried with nickel chloride "brine" solution. The latter is a partial recycle, via line 22, of the nickel chloride product stream 21. The slurried filter cake is then fed to reactor 9 via line 6. The slurry is then reacted by the sequential addition of an oxidizing agent solution via 7, absorber off-gas solution containing absorbed hydrogen chloride via 18 and anhydrous hydrogen chloride via 8. The exothermic reaction is complete when the reaction mix changes to a green color, the color change being preceded by an increase in the rate of temperature increase. By maximizing the hydrogen chloride feed rate and minimizing hydrogen chloride loss to the off-gas absorber 17, the time of reaction can be controlled. Carbon dioxide and excess hydrogen chloride from the reaction are scrubbed via 11 in off-gas absorber 17, the carbon dioxide being vented off. The reaction mix after cooling, is adjusted from a pH of about 0.3 to about 2.5 with base added via 10. The cooled, pH-stabilized reaction mix is fed via 12 to a filtration unit 13. Iron and sulfur are removed as precipitates, and the filtrate is sent via 19 to unit 20 for final filtration and pH adjustment. At this point, copper can be removed from the product nickel chloride "brine" solution by use of suitable complexing agents. The final product is recovered via 21, a portion of this nickel chloride "brine" solution being recycled via 22 to slurry tank 5. The filtered reaction mix cake is then washed with water wash 14, the filtrate being sent via 16 to the off-gas absorber 17, wherein this wash is used to scrub excess hydrogen chloride from reactor 9.

The following Example illustrates the process of the invention:

EXAMPLE

A) APPARATUS

A lecture bottle of anhydrous hydrogen chloride is attached to a stainless steel 316 valve to control the rate of addition of hydrogen chloride, which is measured by a rotometer. The rotometer is attached to a gas trap to prevent "suck back" into the rotometer and lecture bottle. The gas trap is attached to one neck of a 4-necked, 500 ml. round bottom flask with a pressure hose. A second gas trap prevents reaction mix overflow from contaminating the off-gas absorber water. The second gas trap is connected to the off-gas absorber which consists of two 500 ml. gas collection vessels connected in series. The off-gas collector is a 500 ml. gas collection vessel. All pieces of equipment are connected with $\frac{3}{8}''$ OD rubber tubing. A variable speed controlled stirrer, consisting of a glass rod and Teflon ® blade, is secured into a third neck of the flask by means of a Teflon plug and sealed into the neck with a rubber O-ring. A thermometer graduated from 0°-150° C. is secured in the fourth neck of the flask by means of a ground glass fitting. Rubber stoppers are used in the gas trap and hydrogen chloride inlet tube to the reactor.

B) Procedure 200-300 gms. of acrylate process waste sludge are weighed out and transferred to a Buchner funnel-filtration flask apparatus connected to a water aspirator. The sludge is filtered by suction through a Whatman No. 1 filter paper. The filter cake is then washed with 300-450 gm. of water, maintaining the liquid level above the filter cake to insure even washing. When the filter cake cracks, 50 gm. of it is transferred to a 250 ml. beaker, to which is added 100 gm. of a standard 8% nickel chloride "brine" solution and mixed thoroughly. This slurry is then transferred to the 500 ml. round bottom flask, which serves as the reactor. The slurry is weighed prior to transfer to the reactor. 8.1 gms. of 45.5% sodium chlorate solution is then added to the reactor, followed by 12.5 gms. of a standard 3% nickel chloride "brine" solution. The reactor is then closed and addition of anhydrous hydrogen chloride commenced. Off-gas is collected over water. The hydrogen chloride is fed with temperature being recorded as a function of time, until there is a color change from black to green. The hydrogen chloride is cut off and the lecture bottle weighed. The reaction mix is stirred continuously until the temperature decreases to 30°-40° C. The reaction mix is then transferred to a 400 ml. breaker, and using a pH meter, the pH of the mix is carefully adjusted to 2.5 by dropwise addition of 50% sodium hydroxide solution. Once the pH has stabilized, the mix is filtered on a Buchner funnel. The filtrate is weighed and transferred to a sample bottle, and the filter cake is washed with 10-15 ml. of water. This filter cake is weighed, dried in a 110° C. oven for at least two hours and then reweighed. Both filtrates and the filter cake can then be analyzed for nickel, iron and copper.

The calculations used to determine percent recovery of nickel and percent iron and copper removed are as follows:

1. % Nickel Recovered from Sludge $$\frac{(\text{Wt. Ni filtrates}) - (\text{Wt. Ni 8\% Ni brine} + \text{wt. Ni 3\% Ni brine})}{(\text{Wt. Ni filtrates} + \text{wt. Ni filter cake}) - (\text{Wt. Ni 8\% Ni brine} + \text{wt. Ni. 3\% Ni brine})} \times 100$$

2. % Ni Recovered Overall $$\frac{\text{Wt. Ni filtrates}}{\text{Wt. two Ni filtrates} + \text{wt. Ni filter cake}} \times 100$$

3. % Fe Removed $$\frac{\text{Wt. Fe filter cake}}{\text{Wt. Fe filter cake} + \text{wt. Fe filtrates}} \times 100$$

4. % Cu Removed $$\frac{\text{Wt. Cu filter cake}}{\text{Wt. Cu filter cake} + \text{Wt. Cu filtrates}} \times 100$$

It is clear that the process, as outlined, provides an extremely effective way of recovering nickel from industrial wastes containing low levels of nickel. When run continuously, the only wastes from the process itself are the wash water from the initial waste wash and the spent filter cake. While the process as described is deemed to represent the best mode of practicing it, other variations and modifications apparent to those skilled in the art may be resorted to without departing from the spirit and scope of the invention. Such modifications and variations are considered to be within the purview and scope of the invention and appended claims.

We claim:

1. A process for the recovery of nickel from nickel-containing waste which comprises the steps:
    (a) slurrying the waste with a nickel chloride brine solution;
    (b) reacting the slurry by addition of an oxidizing agent solution, followed by anhydrous hydrogen chloride to obtain a nickel chloride containing reaction mix; and
    (c) filtering the nickel chloride containing reaction mix to obtain a nickel chloride solution.

2. The process of claim 1 where the reaction is carried out at a temperature of 30°–90° C.

3. A process for the recovery of nickel from nickel-containing waste which comprises the steps:
    (a) filtering and washing a nickel-containing waste with water;
    (b) slurrying the washed waste with a nickel chloride brine solution;
    (c) reacting the slurry by addition of an oxidizing agent solution, followed by anhydrous hydrogen chloride to obtain a nickel chloride containing reaction mix;
    (d) adjusting the pH of the nickel chloride containing reaction mix to 2.5 with a base; and
    (e) filtering the reaction mix to obtain a nickel chloride solution.

4. A process for the continuous recovery of nickel-containing waste sludge which comprises the steps:
    (a) filtering and washing a nickel-containing waste sludge with water;
    (b) slurrying the washed sludge with a portion of the nickel chloride brine solution obtained in step (e);
    (c) reacting the slurry by the sequential addition of the following reactants; oxidizing agent solution, a nickel wash solution obtained in step (f) and anhydrous hydrogen chloride to obtain a nickel chloride containing reaction mix;
    (d) adjusting the pH of the nickel chloride containing reaction mix to 2.5 with a base;
    (e) filtering the reaction mix to obtain a nickel chloride brine solution and a filter cake; and
    (f) washing the filter cake to obtain a nickel wash solution.

5. The process of claim 4 where the base used to adjust the pH is a 50% aqueous alkali or alkaline earth metal hydroxide solution.

6. The process of claim 4 wherein said sludge also contains copper and the copper is recovered with nickel and is removed from the nickel chloride brine solution by complexing with an agent selected from the group consisting of sodium oxalate-oxalic acid, sodium oleate-oleic acid, sodium citrate-citric acid and 8-hydroxyquinoline.

7. The process of claim 4 wherein excess hydrogen chloride is vented from the reaction of step (c), absorbing said vented off-gas in the nickel wash solution of step (f) and scrubbing the hydrogen chloride in an off-gas absorber and recycling the resultant scrubbed solution to step (c).

* * * * *